(12) United States Patent
Papakostas et al.

(10) Patent No.: US 7,591,165 B2
(45) Date of Patent: Sep. 22, 2009

(54) CONTROL CIRCUIT FOR SENSOR ARRAY AND RELATED METHODS

(75) Inventors: Thomas Papakostas, Larissa (GR); Charles Malacaria, Medfield, MA (US); Boris Dubinsky, Newton, MA (US)

(73) Assignee: Tekscan Incorporated, South Boston, MA (US)

( * ) Notice: Subject to any disclaimer, the term of this patent is extended or adjusted under 35 U.S.C. 154(b) by 21 days.

(21) Appl. No.: 11/392,210

(22) Filed: Mar. 29, 2006

(65) Prior Publication Data
US 2007/0234825 A1   Oct. 11, 2007

(51) Int. Cl.
*G01R 27/28* (2006.01)

(52) U.S. Cl. .................. 73/1.59; 324/616; 702/100; 702/104

(58) Field of Classification Search .......... 73/1.57, 73/1.59, 1.61, 1.62, 614, 615, 616; 324/614, 324/615, 616; 702/99, 100, 104
See application file for complete search history.

(56) References Cited

U.S. PATENT DOCUMENTS

| | | | |
|---|---|---|---|
| 4,111,058 A | | 9/1978 | Gross |
| 4,665,440 A | | 5/1987 | Tromborg |
| 4,856,993 A | | 8/1989 | Maness et al. |
| 5,010,774 A | | 4/1991 | Kikuo et al. |
| 5,086,652 A | | 2/1992 | Kropp |
| 5,237,879 A | | 8/1993 | Speeter |
| 5,369,434 A | | 11/1994 | Kawamoto et al. |
| 5,505,072 A | | 4/1996 | Oreper |
| 5,515,040 A | * | 5/1996 | Lee et al. ............... 340/870.04 |
| 5,736,656 A | * | 4/1998 | Fullen et al. ............. 73/865.4 |
| 5,756,904 A | | 5/1998 | Oreper et al. |
| 5,905,209 A | | 5/1999 | Oreper |
| 5,914,465 A | | 6/1999 | Allen et al. |
| 6,226,271 B1 | * | 5/2001 | Dent ......................... 370/252 |
| 6,234,006 B1 | | 5/2001 | Sunshine et al. |
| 6,354,999 B1 | | 3/2002 | Dgany et al. |

(Continued)

FOREIGN PATENT DOCUMENTS

EP    0 970 657 A1    1/2000

(Continued)

OTHER PUBLICATIONS

English translation of communication dated Dec. 3, 2007 regarding Japanese Patent Application No. 2000-504431.

(Continued)

*Primary Examiner*—David A. Rogers
(74) *Attorney, Agent, or Firm*—Wolf, Greenfield & Sacks, P.C.

(57) ABSTRACT

A control circuit for scanning a pressure or force responsive sensor array is disclosed. Pressure or force sensors formed of an array of pressure or force responsive sensor elements can be used to acquire pressure or force measurements in response to an applied load. The control circuit can sample signals from the sensor elements to detect the pressure or force at one or more sensor elements of the sensor array. The circuit herein may provide for relatively faster scan rates. A user may define a subset or subsets of sensor elements of the sensor array to be scanned. Various methods and related circuitry for adjusting for sensor characteristics are also disclosed.

17 Claims, 12 Drawing Sheets

U.S. PATENT DOCUMENTS

| | | |
|---|---|---|
| 6,374,681 B1 | 4/2002 | Vanuytven |
| 6,534,985 B2 | 3/2003 | Holladay, III et al. |
| 6,633,656 B1 | 10/2003 | Picard |
| 6,707,449 B2 | 3/2004 | Hinckley et al. |
| 6,750,852 B2 | 6/2004 | Gillespie et al. |
| 6,803,906 B1 | 10/2004 | Morrison |
| 6,885,400 B1 | 4/2005 | Vodanovic |
| 6,964,205 B2 | 11/2005 | Papakostas et al. |
| 6,972,401 B2 | 12/2005 | Akitt et al. |
| 6,985,779 B2 | 1/2006 | Hsiung et al. |
| 7,339,580 B2 | 3/2008 | Westerman et al. |
| 2005/0021244 A1* | 1/2005 | Nicoli et al. ............... 702/29 |
| 2005/0029453 A1* | 2/2005 | Allen et al. ............... 250/332 |
| 2005/0068041 A1 | 3/2005 | Kress et al. |
| 2005/0128082 A1* | 6/2005 | Stanley et al. ............ 340/561 |
| 2005/0287974 A1* | 12/2005 | Zhou ....................... 455/226.2 |
| 2006/0007172 A1 | 1/2006 | Baker et al. |
| 2006/0077182 A1 | 4/2006 | Studt |
| 2007/0113681 A1 | 5/2007 | Nishimura et al. |

FOREIGN PATENT DOCUMENTS

| | | |
|---|---|---|
| EP | 1 602 907 A1 | 12/2005 |
| EP | 1621750 A1 * | 2/2006 |
| JP | 04-161824 | 6/1992 |
| JP | 06-334523 | 12/1994 |
| JP | 07-333089 | 12/1995 |
| WO | WO 95/18357 A1 | 7/1995 |
| WO | WO 99/05492 A1 | 2/1999 |
| WO | WO 00/30909 A1 | 6/2000 |
| WO | WO 03/036612 A1 | 5/2003 |

OTHER PUBLICATIONS

Search Report and Written Opinion from International Searching Authority mailed Oct. 23, 2007 regarding International Application No. PCT/US2007/004987.

Search Report and Written Opinion from International Searching Authority mailed Sep. 17, 2007 regarding International Application No. PCT/US2007/005120.

Ishikawa, M., "Parallel Processing for Sensory Information," *Electronics*, 75:2, 28-42 (1992).

Office Action from European Patent Application EP 07751853.8 dated Feb. 25, 2009.

* cited by examiner

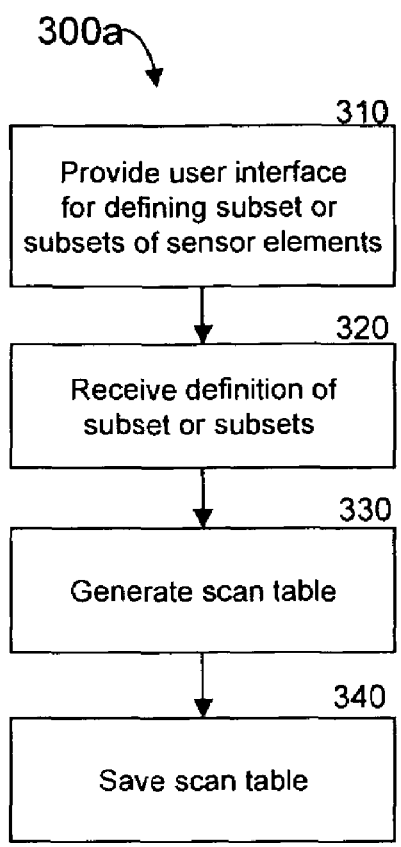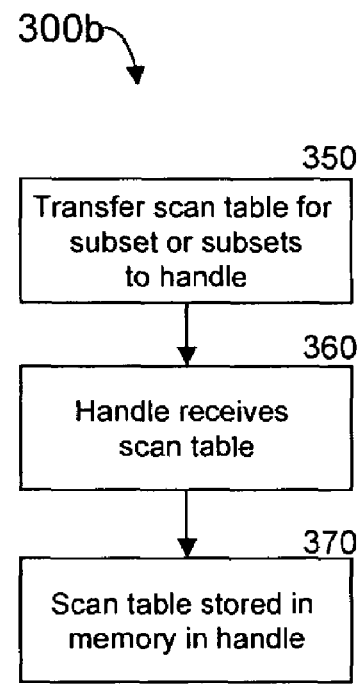
FIG. 3a
FIG. 3b

1200

| ID | Value |
|---|---|
| 1211 | 1010010 |
| 1212 | 0101000 |
| 1213 | 0101000 |
| 1214 | 0101001 |
| 1215 | 0101001 |
| 1216 | 0101010 |
| 1221 | 1010001 |
| 1222 | 0001001 |
| 1223 | 0001001 |
| 1224 | 0001100 |
| ... | . . . |
| 1230 | 1111111 |

FIG. 12

CONTROL CIRCUIT FOR SENSOR ARRAY AND RELATED METHODS

FIELD

Aspects of the invention relate to pressure or force sensors formed from an array of pressure or force responsive sensor elements and more particularly to a circuit for scanning such an array.

BACKGROUND

Pressure or force sensors formed of an array of pressure or force responsive sensor elements can be used to acquire pressure or force measurements in response to an applied load. Such arrays may, for example, be used as a contact sensor for dental occlusion, to detect foot pressure in a shoe, to detect pressure or force distribution on a gasket, and in numerous other applications where information on pressure or force distribution over an area is desired. Such arrays typically utilize two layers, each of which has a parallel set of electrodes formed thereon with the electrodes for at least one of the set of electrodes being covered with a variable resistance pressure or force sensitive material (e.g., an ink) or other pressure or force sensitive material (e.g., a variable capacitance material). These arrays may be secured together with the electrodes of one layer crossing the electrodes of the other layer to form sensor elements. By sensing the current passing through each sensor element, the pressure or force at the element may be determined.

SUMMARY

In various embodiments, a circuit and related methods are provided for scanning an array of pressure or force responsive sensor elements, wherein the circuit and/or the methods can provide for higher accuracy and/or a faster scan rate as compared to conventional circuits used for scanning arrays of pressure or force responsive sensor elements. In some embodiments, the higher accuracy comprises measuring more accurate values of the pressure or force applied to the pressure or force responsive sensor elements, as compared to measurements obtained with conventional circuits used for scanning arrays of pressure or force responsive sensor elements.

In one illustrative embodiment, a circuit is provided for scanning an array of pressure or force responsive sensor elements. The circuit comprises a control circuit for controlling the scanning of the pressure or force responsive sensor elements, wherein the control circuit comprises a plurality of modules configured to operate in parallel for faster processing of signals obtained from the scanning of the pressure or force responsive sensor elements.

In another illustrative embodiment, a circuit is provided for scanning an array of pressure or force responsive sensor elements. The circuit comprises a control circuit for controlling the scanning of the pressure or force responsive sensor elements, wherein the control circuit is configured to scan a user definable subset or subsets of the array of pressure or force responsive sensor elements.

In still another illustrative embodiment, a method is provided for scanning an array of pressure or force responsive sensor elements. The method comprises selecting one or more pressure or force responsive elements based on a user definable subset or subsets of the array of pressure or force responsive sensor elements, and obtaining signals indicative of the pressure or force applied to the one or more pressure or force responsive elements selected based on the user definable subset or subsets of the array of pressure or force responsive sensor elements.

In still another illustrative embodiment, a method is provided for calibrating a sensor array of pressure or force responsive sensor elements. Each of the sensor elements are connected by one of one or more first electrodes and one of one or more second electrodes. The sensor elements having signals generated therethrough, wherein the signals are characteristic of a pressure or force applied to the sensor array. The method comprises selecting one of the sensor elements of the sensor array, providing a drive voltage on a first electrode so as to drive the selected sensor element, and determining a path resistance associated with the selected sensor element, wherein the path resistance associated with the selected sensor element comprises at least a resistance of the first electrode and a second electrode that connect to the selected sensor element.

In yet another illustrative embodiment, a method is provided for scanning a sensor array of pressure or force responsive sensor elements. Each of the sensor elements are connected by one of one or more first electrodes and one of one or more second electrodes. The method comprises obtaining a path resistance of a selected sensor element, wherein the path resistance comprises at least a resistance of a first and a second electrode that connect to the selected sensor element, obtaining a current flowing through the path resistance associated with the selected sensor element, determining a voltage drop across the path resistance of the selected sensor element at least partially based on the obtained path resistance and the obtained current, and modifying a drive voltage applied to the first electrode that connects to the selected sensor element at least partially based on the obtained voltage drop.

In a further illustrative embodiment, a method is provided for automatically adjusting gain when scanning an array of pressure or force responsive sensor elements. The method comprises detecting received signals corresponding to one or more sensor elements being scanned, determining a signal strength value at least partially based on at least some of the received signals corresponding to the one or more sensor elements being scanned, and adjusting a gain applied to at least some of the received signals based at least partially on the signal strength value.

In yet another illustrative embodiment, a method is provided for calibrating a sensitivity of a sensor array of pressure or force responsive sensor elements. Each of the sensor elements are connected by one of one or more first electrodes and one of one or more second electrodes. The sensor elements having signals generated therethrough, wherein the signals are characteristic of a pressure or force applied to the sensor array. The one or more second electrodes having received signals thereon associated with the sensor elements, wherein the received signals are modified by a gain value. The method comprises obtaining received signals associated with at least some of the sensor elements, and determining the gain value that modifies the received signals associated with the at least some of the sensor elements so that at least some of the received signals associated with the at least some of the sensor elements lie within a desired range.

In a further illustrative embodiment, a method is provided for adjusting a sensitivity of an array of pressure or force responsive sensor elements. Each of the sensor elements are connected by one of one or more first electrodes and one of one or more second electrodes. The sensor elements having signals generated therethrough, wherein the signals are characteristic of a pressure or force applied to the sensor array.

The one or more second electrodes having received signals thereon associated with the sensor elements. The method comprises obtaining a gain value associated with the desired sensitivity of the sensor elements, and modifying the received signals at least partially based on the gain value associated with the desired sensitivity.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3a is a flow diagram for defining a subset or subsets of sensor elements of a sensor array according to one embodiment;

FIG. 3b is a flow diagram for using a scan table to scan a sensor array according to one embodiment;

FIG. 12 is an example of a scan table according to one embodiment.

DETAILED DESCRIPTION

Sensor systems can include various components that can be interfaced to enable the collection of data from sensor arrays. In some sensor systems, a sensor array may be selected from a variety of different available sensor arrays that may potentially have different shapes, sizes, number of sensor elements, and/or types of sensors. The sensor array may be inserted into an interface, also referred to as a handle or handle interface, that can include circuitry for controlling the scanning of sensor elements and the collection of force or pressure data. The handle may be coupled to a computing device, which may enable the viewing, storage, and/or analysis of the collected data. In various embodiments presented herein, a control circuit within a handle interface is provided which can implement one or more methods that transfer data to a communication link at an enhanced rate as compared to conventional control circuits, enable the utilization of user definable scan subset or subsets, compensate for variations between sensor elements, and/or adjust the sensitivity of a sensor array.

Figure 1:
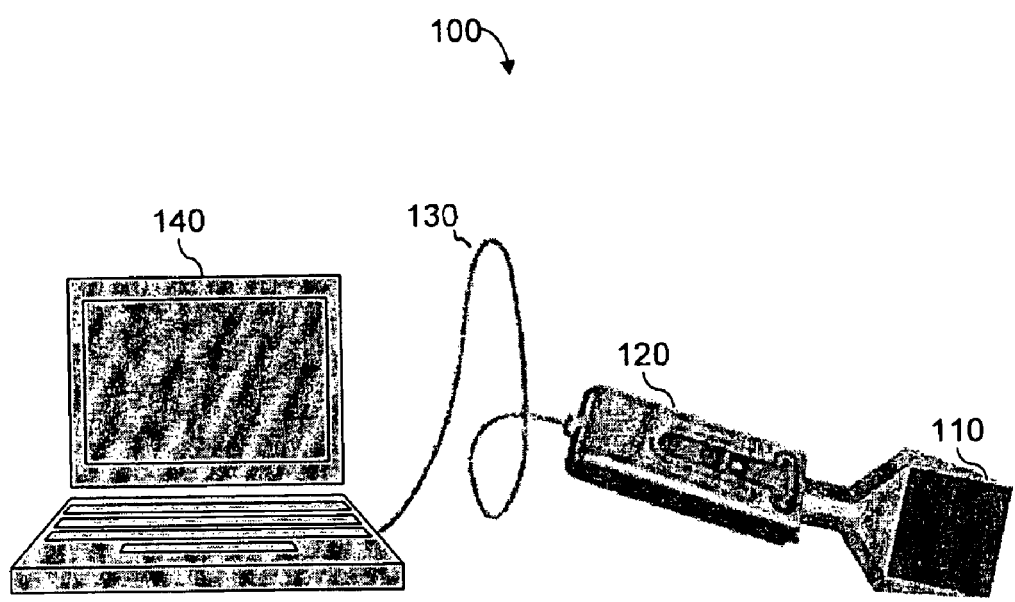
FIG. 1 is a representation of a sensor system according to one embodiment.

FIG. 1 illustrates an embodiment of a sensor system 100 including a sensor array 110, a handle interface 120, a computing device 140, and a communication link 130 between the computing device and the handle interface. A typical sensor array 110 may include resistive elements, which respond to changes in pressure or force with changes in resistance, although other types of sensors are also possible, including, but not limited to capacitive sensors. The sensor array may be configured in a row/column format, although other configurations are possible, as the invention is not limited in this respect. For example, a typical sensor may be formed of an array of 52 drive electrodes and 44 receive electrodes, where each cross-point between the drive and receive electrodes can correspond to a sensor element. As used herein, a sensor element can have any suitable size and/or shape, as the invention is not limited in this respect. In one embodiment, a sensor element may be a sensor point that may be formed by the intersection of a drive electrode and a receive electrode.

The handle interface 120 may include circuitry that can be coupled to the sensor array 110 and that can control the scanning of the sensor elements, compensation for sensor element variations, and/or sensitivity adjustments. The communication link 130 between the handle interface 120 and the computing device 140 may include any suitable type of communication pathway, including wired or wireless communication links. Some types of wired communication links may include, but are not limited to, parallel, USB, and PCI interfaces. Some types of wireless communication links can include, but are not limited to, Bluetooth and 802.11 wireless interfaces. The computing device 140 may include, but is not limited to, a device that enables a user to view pressure or force data corresponding to scanned sensor elements and/or to control the operation of the handle interface 120. Computing device 140 may include, but is not limited to, a personal computer, a personal digital assistant, and/or a server. The computing device 140 may include software to enable viewing, analysis, and/or storage of the collected sensor data and/or or control of the handle interface 120.

Since the handle interface may serve as a scanning control and an interface to the computing device, the performance of the handle interface may be a factor in determining the overall performance, robustness, and flexibility of the sensor system. Conventional interfaces can include data acquisition electronics that acquire sensor data at a rate of about 50 μs per sensor element. Since a typical array can be formed of about 52×44=2288 sensor elements, a sensor element sampling rate of 50 μs results in a total array (or frame) data acquisition time of over 100 ms, and therefore, an acquisition of about 10 total frames per second. This implies that each of the 2288 sensor elements is acquired about 10 times per second, or about a total of 2288×8=18,304 sensor element acquisitions per second. Each acquired sensor element voltage can undergo an analog to digital conversion, hence the acquisition rate may be expressed in terms of digital bits (or bytes) acquired per second. For an 8-bit analog-to-digital converter (ADC) the acquisition data rate for a conventional interface may be given by about 18,304×8 bits/s=18.3 Kbytes/s or about 0.15 Mbits/s.

In such conventional systems, before transferring sensor data to the computing device interface, the mechanics of measuring the pressure or force information, converting the data to a digital format, and transferring the digital data to the communication interface, can be limiting factors. For example, a USB 1.1 communication link can enable the transfer of data to the computing device at a maximum rate of 12 Mbits/s, although in practice, typical rates are about 9 Mbits/s due to overhead limitations. Thus, when data is made available by the handle interface, it can be transferred to the computing device at a rate of about 9 Mbits/s. However, the rate at which the handle interface makes data available for transfer can be significantly lower than the achievable data transfer speed of the communication link, as illustrated by the conventional 0.15 Mbits/s data acquisition rate described previously.

In some embodiments presented herein, a handle interface is provided that couples a sensor array to a computing device and which transfers data to a communication link buffer at a faster rate as compared to conventional handle interfaces. The handle interface may output data at a rate that is greater than about an order of magnitude (e.g., about two orders of magnitude) than the data transfer rate of conventional handle interfaces. In one embodiment, the handle interface may acquire and send data to a communication link buffer (e.g., a USB buffer) at a rate of about 3 Mbits/s. In some embodiments, such rates may be achieved by implementing control circuitry that comprises parallel modules. In one embodiment, a control circuit comprises a field-programmable gate array (FPGA). The parallel nature of FPGA architecture, along with the ability to configure variable register lengths and faster clock rates may allow data acquisition rates to approach USB maximum transfer rates. The FPGA control circuitry may control a high speed ADC and high bandwidth operational amplifiers within the handle, further enhancing data acquisition rates. In some embodiments, the handle interface can enable data acquisition and transfer rates for large sensor arrays, so as to enable real time pressure or force mapping. In one embodiment, a handle interface may enable the sampling of about 2288 sensor elements about 100 times per second, and in one embodiment, up to about 500 times per second.

In various embodiments presented herein, a handle interface that couples a sensor array to a computing device is provided which enables the scanning of user definable sensor elements belonging to a subset or subsets of the entire sensor array. In some such embodiments, the user can define a subset or subsets of sensor elements of the entire sensor array, for example, one sensor element, some sensor elements, some of the rows, some of the columns, and/or some of the rows and columns. In some embodiments, the user can define a subset or subsets of sensor elements by specifying one or more shapes in a visual representation of the sensor array displayed on a computing device. Once a subset or subsets of the entire sensor array is defined, the handle interface need only collect and transfer data from sensor elements belonged to the defined subset or subsets, thereby enabling faster frame sampling rates. As such, some handle interfaces presented herein can allow a user to focus on a definable subset or subsets of a larger pressure or force map, and optionally, collect data for the definable subset or subsets at a faster frame sampling rate.

In various embodiments presented herein, a sensor array calibration method is provided that can account for differences in collected data due to sensor element variations. In some embodiments presented herein, gain adjustment methods are also provided.

Figure 2:
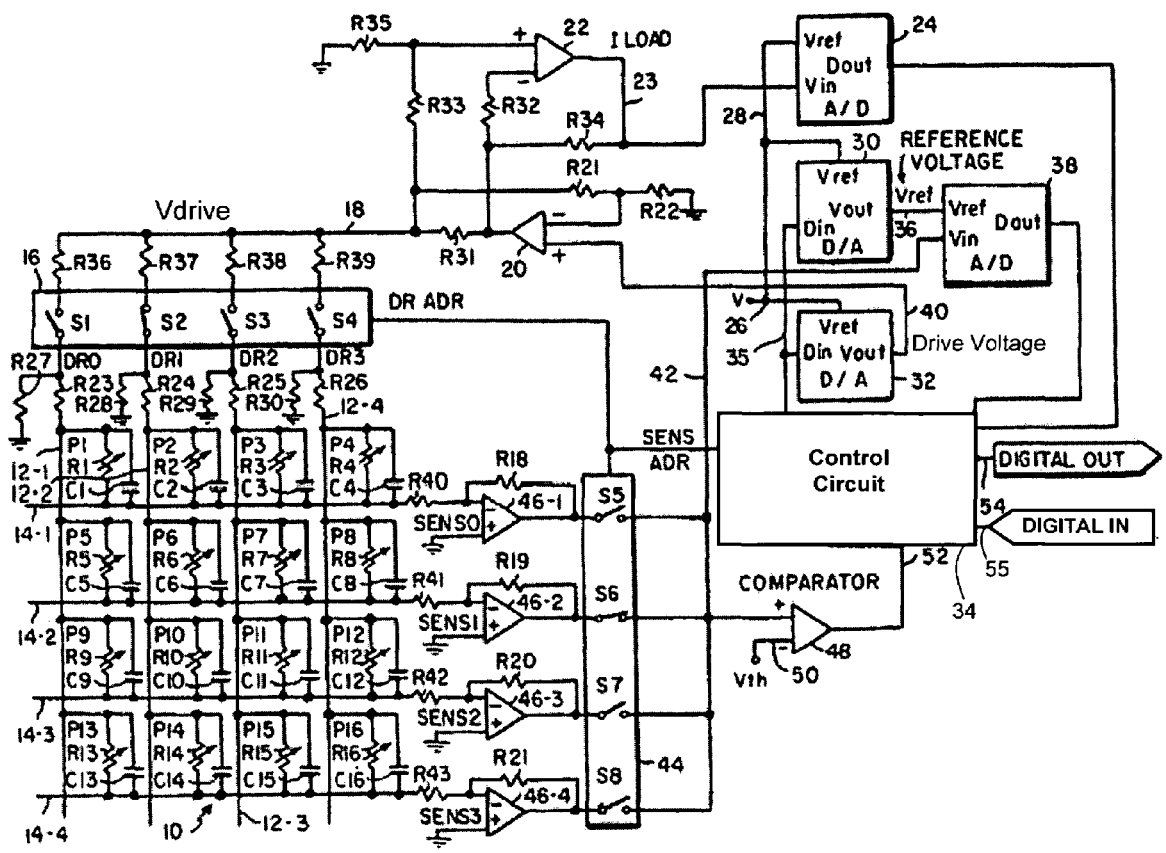
FIG. 2 is a schematic diagram of a sensor array coupled to a handle circuit according to one embodiment.

FIG. 2 illustrates an embodiment wherein a sensor array is coupled to a circuit which may reside within a handle interface. The sensor matrix array 10 is formed from a plurality of first or input (i.e., drive) electrodes 12-1 to 12-4 and a plurality of second or output (i.e., sense or receive) electrodes 14-1 to 14-4. These electrodes may be formed on a thin substrate of a plastic material such as Mylar or on another substrate material, with the substrates being separated by a layer of pressure or force sensitive ink or other pressure or force sensitive material. The pressure or force sensitive material (e.g., ink) may comprise a pressure or force sensitive variable resistance material and/or a variable capacitance material.

The intersection of each first electrode with each second electrode forms sensor elements P1-P16. Each sensor element can have a resistance R1-R16 which varies with the pressure or force applied to the sensor element, being very high, in the order of megaohms, when no pressure or force is applied to the element, and being as little as 1,000 ohms when pressure or force is applied to the element. While not specifically designed into the circuit, there can also be a trace capacitance C1-C16 at each of the sensor elements, where the capacitance may be in the order of 3 to 8 picofarads. The capacitance is formed by the electrodes as plates with the thin variable resistance layer therebetween serving as the dielectric. It should be appreciated that although only 16 sensor elements are illustrated in the embodiment of FIG. 1, any number of sensor elements may be utilized, as the invention is not limited in this respect.

A drive signal or voltage Vdrive on line 18 is applied to each of the first electrodes 12 through a first multiplexer or switch 16. Each of the electrodes 12-1 to 12-4 has an inherent trace resistance which is illustrated in FIG. 2 by lumped resistors R23, R24, R25 and R26, respectively, through which the drive voltage passes. A parallel path to ground can also be provided for each input electrode 12 through bleed-off resistors R27, R28, R29 and R30, respectively, through which the trace capacitance for a sensor element may rapidly discharge, thereby reducing the settling time for the circuit between scans of sensor elements to as little as one microsecond. The value of each of these resistors may be relatively low, for example in the range of two to ten kohms.

In one embodiment, the drive voltage (Vdrive) is applied to each switch S1-S4 of multiplexer 16, with each switch having a corresponding inherent resistance, which is illustrated in the figure as a lumped resistor R36, R37, R38 and R39, respectively. These resistances are typically in the 50 to 100 ohm range. The signal on Vdrive line 18 may be obtained from operational amplifier 20 through a resistor R31. The voltage on the side of R31 adjacent amplifier 20 is connected through a resistor R32 to the negative input of an operational amplifier 22 and is also connected through a resistor R34 to the voltage input of an A/D converter 24. The voltage on the other side of resistor R31 is applied through R21 as a feedback to operational amplifier 20, with the signal passing through resistor R21 also being applied through resistor R22 to ground. In addition, the signal on the other side of resistor R31 is applied through resistor R33, both to the positive input of operational amplifier 22 and through resistor R35 to ground.

In the embodiment described in FIG. 2, the output from operational amplifier 22, which is indicative of the load current passing through resistor R31 on Vdrive line 18, is connected to the Vin input of A/D converter 24. The other input to converter 24 is a voltage reference input for the converter and is obtained from a fixed voltage source 26 over line 28. The signal on line 28 is also applied to the reference inputs on D/A converters 30 and 32. The digital inputs to converters 30 and 32 are obtained on lines 35 from a control circuit 34.

In some embodiments, control circuit 34 may comprise a field-programmable gate array (FPGA), which includes programmable logic components and programmable interconnects that can perform one or more of the various functions described herein. In other embodiments, control circuit 34 can include a standard microprocessor or other processor programmed to perform the various functions. In some embodiments, control circuit 34 may be a special purpose piece of hardware for performing these functions, may be some type of hybrid circuit which performs some of the functions itself and serves as an interface with other processing circuitry which performs the other functions, or may be other suitable control circuitry. Features of control circuit 34 in various embodiments shall be described further below.

Converter 30 develops a reference voltage on line 36 which is applied to the reference input of output A/D converter 38, while the input to D/A converter 32 is indicative of a drive voltage. The drive voltage output from D/A converter 32 is applied through line 40 to the positive input of operational amplifier 20. While the voltage on line 40 could be used directly as Vdrive without passing through amplifier 20, it may be preferable to include amplifier 20 and the related circuit to compensate for voltage drops across R31. The Vin input for A/D converter 38 is output line 42 from output multiplexer 44.

Output multiplexer 44, also referred to as a receive multiplexer, receives each of its inputs from an output of an operational amplifier 46-1 to 46-4. Each operational amplifier receives signals on a corresponding electrode 14-1 to 14-4 at its negative input. Resistors R40, R41, R42, R43 represent the trace resistances for the corresponding output electrodes. The output of each operational amplifier is also fed back through a corresponding resistor R18, R19, R20 and R21, respectively. The positive input to each operational amplifier 46 is connected to ground. The effect of the feedback signal for each of the operational amplifiers 46 is to maintain the output end of the corresponding electrode at substantially the ground potential. The outputs of amplifiers 46 reflect the signal/current of the electrodes 14.

Output line 42 from multiplexer 44 is also connected to the positive input of comparator 48. The negative input to comparator 48 is a threshold voltage on line 50. Thus, comparator 48 generates an output on line 52 to control circuit 34 only if the signal detected at array 10 exceeds some predetermined threshold. The digital output from converter 38 is connected to control circuit 34 which may process the received output from converter 38 and generate an output signal on digital output line 54.

The output on digital output line 54 may be coupled to a computing device (not shown) via any suitable interface, including, but not limited to a wired interface, such as a USB interface, or a wireless interface, such as a Bluetooth or 802.11 interface. Communication from the computing device (not shown) to the control circuit 34 may be achieved via a digital input line 55 via any suitable interface, such as those described for the digital output line 54.

The circuit of FIG. 2 is similar to the circuit presented in U.S. Pat. No. 5,505,072 (No. '072) and U.S. Pat. No. 4,856,993 (No. '993), which are assigned to the assignee of the current application, both of which are incorporated herein by reference. In operation, the circuit of FIG. 2 can perform a scan of the sensor array in a similar manner as the scanning operation presented in patents No. '072 and No. '993, and may incorporate some of the features of the circuit in patent No. '072 and/or patent No. '993. Additionally, or alternatively, the circuit of FIG. 2 and other embodiments presented herein may incorporate control circuit features that shall be further described below.

It should be appreciated that the control circuit features presented herein may also be incorporated into other circuit configurations for controlling the scanning of a sensor array and/or collecting data from a sensor array, and the invention is not limited to the embodiments presented herein. For example, an alternative embodiment of a sensor system including a sensor array coupled to a control circuit is presented in U.S. Pat. No. 5,905,209 (No. '209), which is assigned to the assignee of the current application and is incorporated herein by reference.

Figure 4:
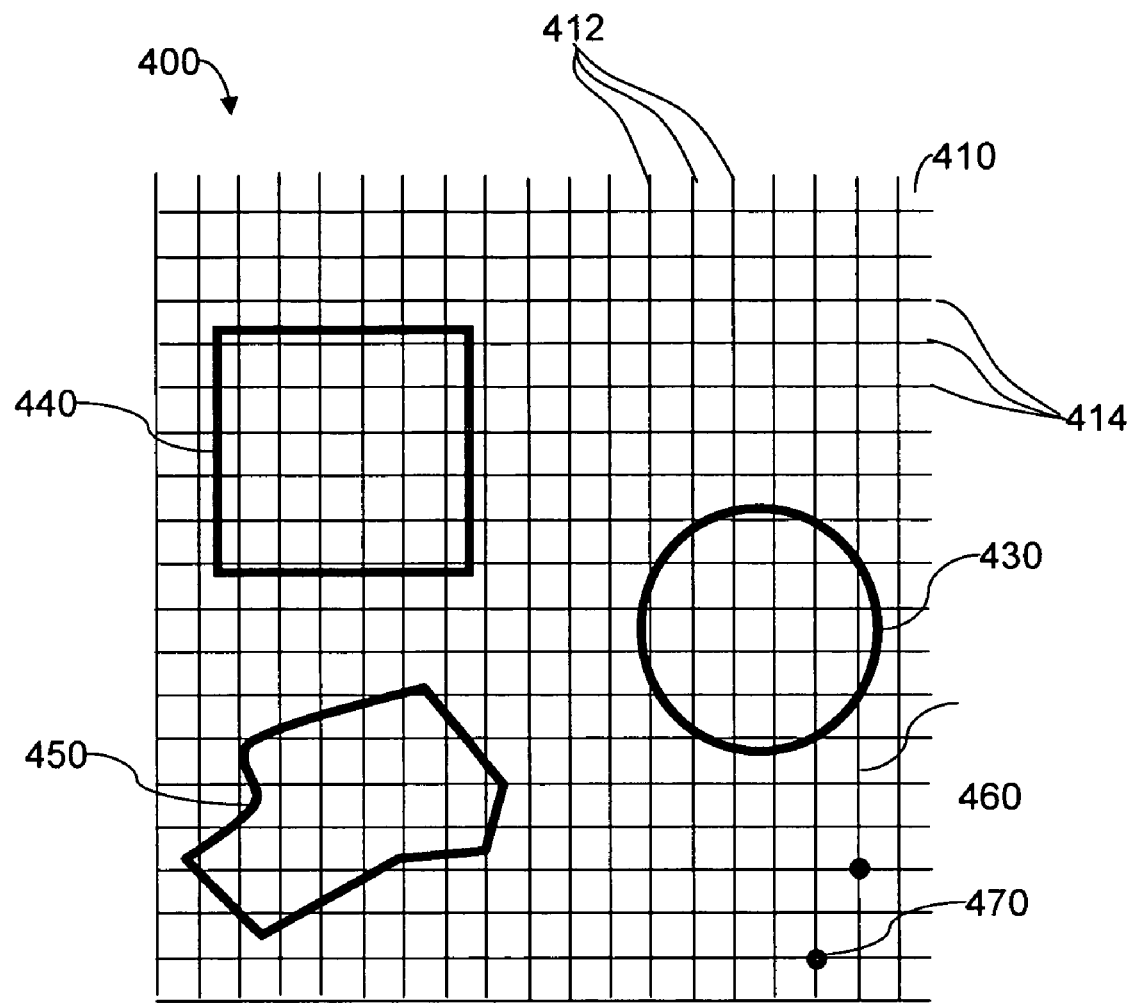
FIG. 4 is a representation of a sensor array enabling the definition of a subset or subsets of sensor elements of the sensor array according to one embodiment.

As described above, in some embodiments, a user may define a subset or subsets of sensor elements of the sensor array. During scanning of the sensor array, the subset or subsets of sensor elements need be scanned. FIG. 3*a* is an embodiment of a method, illustrated by flow diagram 300*a*, for enabling the definition of a subset or subsets of sensor elements of a sensor array. In step 310, a user interface may be provided so that a user may define a subset or subsets of a sensor array. The user interface may be presented on a computing device that is coupled to a handle interface of the sensor array, as illustrated in the sensor system of FIG. 1. The user interface may include a visual representation of the sensor array, and may enable the user to define a subset or subsets of sensor elements by defining one or more desired shapes and/or boundaries within the representation of the sensor array, as illustrated in FIG. 4, by selecting individual sensor elements, and/or by any other means, as the invention is not limited in this respect.

In representation 400, the sensor elements of the sensor array 410 are located at the intersection of drive electrodes 412 and receive electrodes 414. For illustration purposes, a rectangular sensor array 410 is presented, but it should be appreciated that any other sensor array configuration is possible. In representation 400, a user may have defined (e.g., via drawing using a pointer) various shapes and/or boundaries, including a rectangle 440, a circle or ellipse 430, and/or an irregular shape 450, so as to define the boundaries surrounding the subset or subsets of sensor elements for which data should be collected. Additionally, or alternatively, other methods of defining a subset of sensor elements for which scan data should be collected may also be used, including but not limited to, defining a subset or subsets of sensor elements by selecting one or more sensor elements, as illustrated for sensor elements 460 and 470, one or more rows (not shown), and/or one or more columns (not shown).

Additionally, or alternatively, a subset or subsets of sensor elements may be defined by a pattern superimposed on the representation of the sensor array. For example, a rectangular checkerboard pattern superimposed on the representation of the sensor array may define a subset or subsets of sensor elements in regions where the pattern is solid (e.g., solid rectangles of the checkerboard pattern). Such patterns may allow for the specification of the spatial resolution of sensor elements to be scanned based on the size of the solid regions of the pattern. For example, if pressure or force data having a certain spatial resolution is desired, and the sensor array includes sensor elements with a higher than desired spatial resolution, a pattern (e.g., a checkerboard pattern) may be used to define a subset of sensor elements to be scanned. In this way, data need only be collected for sensor elements that yield the desired resolution and/or focus in on the desired region(s) of the sensor array. Furthermore, it should be appreciated that the definition of the subset or subsets of sensor elements need not necessarily be performed graphically, and other methods, such as coordinate input of a subset or subsets may also be used.

In step 320, the computing device presenting the user interface can receive the defined subset or subsets of sensor elements. In step 330, the defined subset or subsets of sensor elements can be used to generate a scan table indicating the sensor elements which lie within the subset or subsets of sensor elements of the sensor array. The scan table may include any suitable representation for the sensor elements within the defined subset or subsets. In some embodiments, the sensor elements may be specified by reference to one or more drive lines and one or more receive lines for each of the drive lines, thereby providing a two-dimensional coordinate representation of the subset or subsets of sensor elements.

For example, as illustrated in FIG. 12, a scan table 1200 can include a list of 7-bit values, wherein the first bit of each value can be used to indicate a new drive line. In scan table 1200, a first bit of "1" indicates a new drive line and the other six bits define the specific drive line being referenced. Conversely, a first bit value of "0" indicates a specific sensor element on the most recently referenced drive line and the other six bits specify the specific receive line being referenced. For example, value 1211 in the table has a first bit of "1" which implies that a new drive line is specified by this value, where the drive line is defined by the following six bits "010010". The next value 1212 indicates a specific sensor element on the most recently referenced drive line defined by value 1211. Similarly, values 1213-16, all having a first bit of "0", indicate specific sensor elements via the specification of receive lines intersecting the most recently referenced drive line given by value 1211. Value 1221, having a first bit of "1", indicates that a new drive line is specified by the following six bits of the value. Values 1222-24 define specific sensor elements via the specification of receive lines intersecting the most recently referenced drive line given by value 1221.

The scan table 1200 may have any number of such 7-bit values, specifying drive lines and corresponding receives lines for each sensor element in a subset or subsets of the entire sensor array. In the scan table 1200, a 7-bit value of "1111111" (value 1720) indicates the end of the table, although it should be appreciated that any other value may be used to indicate the end of the table. It should be appreciated that this is just one example of a scan table, and various modifications are possible. For example, one modification may include using any desired number of bits (e.g., 6-bits, 7-bits, 8-bits, 9-bits, etc.) for the values of the table, which need not necessarily be limited to the 7-bit illustrative embodiment described above. A desired number of bits for the values in the scan table may be chosen based on the number of drive and receive lines of the sensor array, so as to uniquely identify the sensor elements of the sensor array.

Returning to FIG. 3a, upon the generation of the scan table 330, the scan table corresponding to the defined scan area may be used in a scan and/or may be saved to a storage device (e.g., on the computing device), as indicated in step 340. Any number of such scan tables may be saved for further use, as desired by the user.

FIG. 3b is an embodiment of a method, illustrated by flow diagram 300b, for using a desired scan table to scan a sensor array. In step 350, a desired scan table corresponding to a defined subset or subsets of the sensor array is transferred from a computing device to a handle interface via a communication link. The handle interface can receive the scan table via the communication link (step 360), and the scan table can be stored in a scan table memory in the handle (step 370). In some embodiments, steps 360 and 370 may be performed by a control circuit within the handle interface, and the scan table memory may reside within the control circuit. In an illustrative embodiment, the scan table memory may include a register in an FPGA control circuit. During a scan of the sensor array, the handle interface may use the scan table in the scan table memory to select the sensor elements for which data should be collected and transferred to the computing device.

Figure 5:
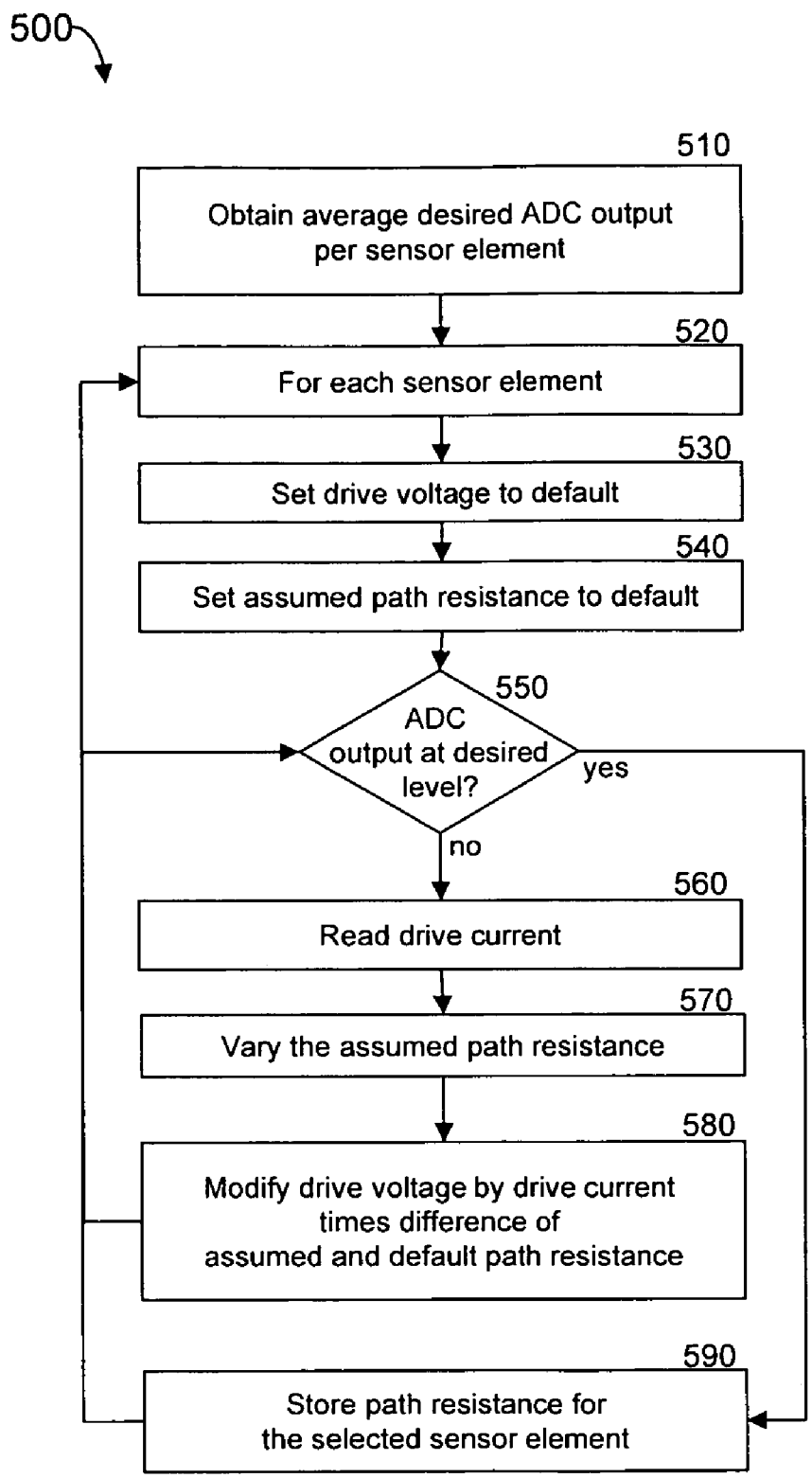
FIG. 5 is a flow diagram for performing a calibration of sensor elements of a sensor array according to one embodiment.

In some embodiments, sensor elements of a sensor array can be calibrated to account for path resistance variations amongst the sensor elements of the sensor array. The path resistance variations amongst sensor elements may be due to variations of trace resistance of drive and receive electrodes amongst the sensor elements (e.g., due to different electrode lengths for different sensor elements), variations in sensor element resistance (e.g., due to variations in the distance between the intersecting electrodes and/or in the resistivity of material between the electrodes), and/or any other resistance variations amongst the sensor elements. FIG. 5 is an embodiment of a method, illustrated by flow diagram 500, that enables calibration of sensor elements of a sensor array.

Such calibration may be used to compensate for any variations of path resistance amongst sensor elements on a sensor array. Such calibration may be particularly useful for large sensor arrays, where due to significant voltage drops across long electrodes, it may be significantly beneficial to modify drive voltages applied for each sensor element so as to compensate for path resistance variations amongst sensor elements. During scanning, such compensation may be performed by circuitry within the handle, for example, by measuring the drive current when a given sensor element is selected for scanning and compensating the drive voltage (or reference voltage) accordingly. The drive voltage may be compensated based on the drive current times a path resistance for a selected sensor element, wherein the path resistance for the selected sensor element may have been determined during a previous sensor array calibration procedure.

In one embodiment, the sensor array calibration procedure 500 may be performed when a sensor array is coupled to a handle. The sensor array calibration procedure may be performed by a control circuit within the handle. The sensor array calibration may involve the application of a pressure or force to sensor elements in the sensor array, so as to obtain an average desired output of the receive line A/D converter across all the sensor elements of the sensor array (step 510). The applied pressure or force can be a substantially uniform pressure or force over the entire sensor array. For example, the sensor array may be placed in a bladder, and enough pressure or force may be applied so as to produce an average desired receive line AID output per sensor element. For example, the average desired receive line A/D output may be about 190 per sensor element out of a maximum reading of 255 for an 8-bit A/D converter. It also should be appreciated that obtaining a desired output of the receive line A/D converter across the sensor elements may be accomplished with other suitable approaches, and need not necessarily be achieved via the application of pressure or force to the sensor elements.

For each sensor element (step 520), the drive voltage on the handle can be set to a default value (step 530). For example, the default value may be about 0.3 volt. Also, an assumed path resistance for the selected sensor element may be set to a default value (step 540). For example, the default value may be 128 ohms for large sensor arrays.

A determination may be made as to whether the receive line A/D converter output for the selected sensor element is at the desired level (step 550), for example a reading of 190 as described above. If this is the case, the method can proceed to step 590, where the assumed path resistance is stored for the selected sensor element. If this is not the case, the method can proceed with a variation of the drive voltage until the output from the receive line A/D attains the desired level. In method 500, such a process can involve reading the drive current (step 560), varying the assumed path resistance (step 570), for example, by incrementally increasing and/or decreasing the assumed path resistance, and modifying the drive voltage by adding the drive current times the difference between the assumed and default path resistance (step 580). The process continues to step 550 and, once again, a determination is made as to whether the receive line A/D has attained the desired level for the selected sensor element.

The process is repeated until the test in step 550 determines that the desired level has been achieved, and then steps 530-590 are repeated for each sensor element of the sensor array. Upon completion of process 500, a sensor array calibration file can be generated which can include path resistances for each sensor element on the sensor array. It should be appreciated that specific sensor arrays of the same type may have slightly different calibration files due to tolerance variations amongst the sensor arrays. The sensor array calibration file may be transferred from the handle to a coupled computing device, and stored with an identification number corresponding to the specific sensor array. It should also be understood that the path resistances generated via the illustrated process need not necessarily correspond to actual path resistances for each sensor element, but rather may be indicative of relative differences amongst path resistances. Therefore, as used herein, the path resistance of a sensor element is meant to also encompass values that are indicative of relative differences amongst path resistances.

Figure 6:
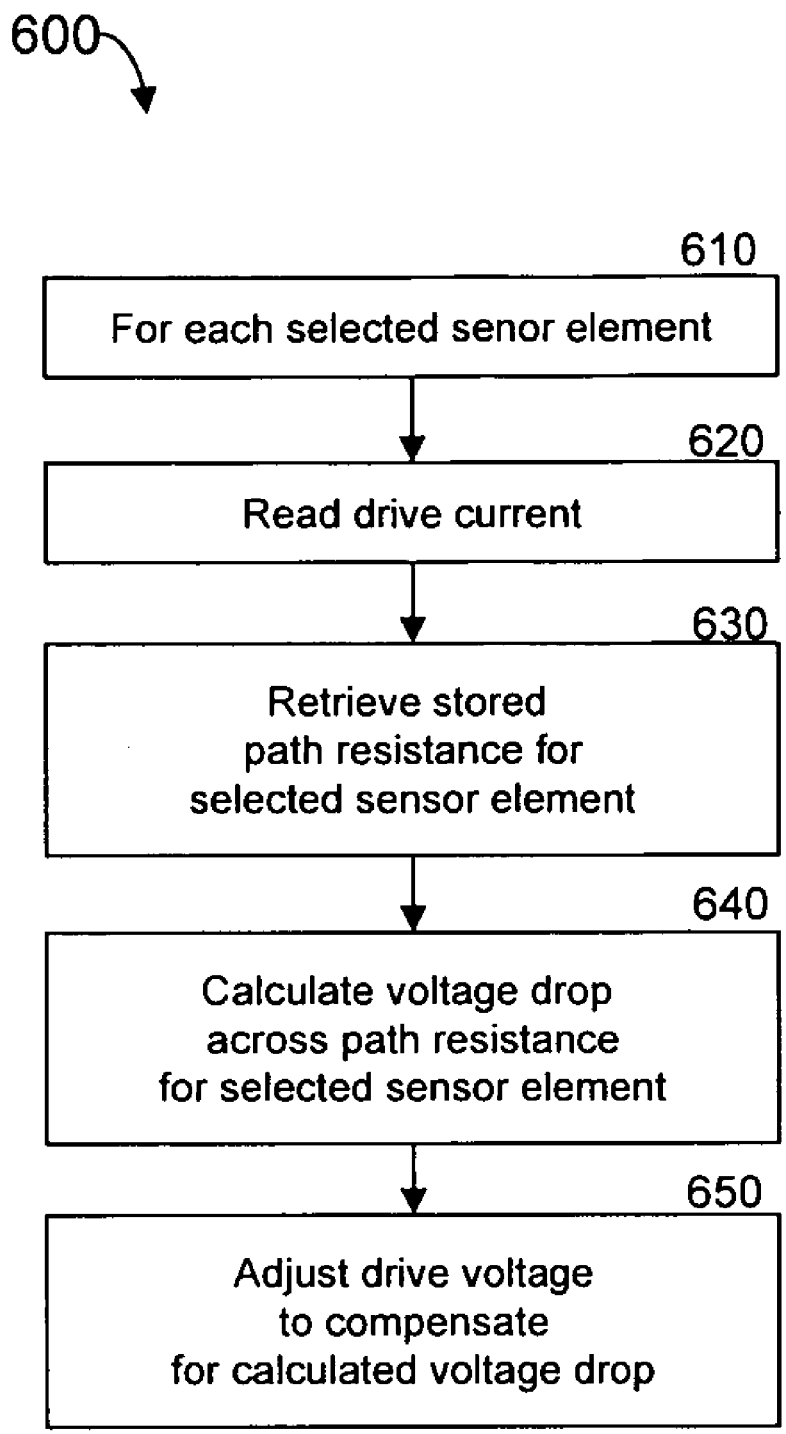
FIG. 6 is a flow diagram for using sensor element calibration data for a sensor array during a scan operation according to one embodiment.

FIG. 6 is an embodiment of a method, illustrated by flow diagram 600, for using sensor array calibration data (such as the calibration data generated by the method of FIG. 5) during a scan operation of a corresponding sensor array. Such a process may be performed by a control circuit within the handle (e.g., control circuit 34). During scanning, for each selected sensor element (step 610), the drive current is read within the handle (step 620). For example, the drive current may be determined based on the output of A/D converter 24 in FIG. 2. The selected sensor element's stored path resistance calibration data may be retrieved to enable drive voltage compensation that accounts for variations amongst sensor elements of the sensor array. In particular, the path resistance for the selected sensor element may be retrieved (e.g., from within a register in the control circuit 34) (step 630). Based on the path resistance of the selected sensor element and the drive current reading, a calculation of the voltage drop across the path resistance for the selected sensor element may be performed (step 640), for example using Ohm's law, namely by multiplying the current by the path resistance. The drive voltage may be compensated by adding the calculated voltage drop to the drive voltage (step 650). Such a process can be performed for each selected sensor element, thereby compensating for path resistance variations amongst sensor elements of a sensor array. As previously described, such a compensation process may be significantly beneficial for large sensor arrays having long electrodes.

Figure 7:
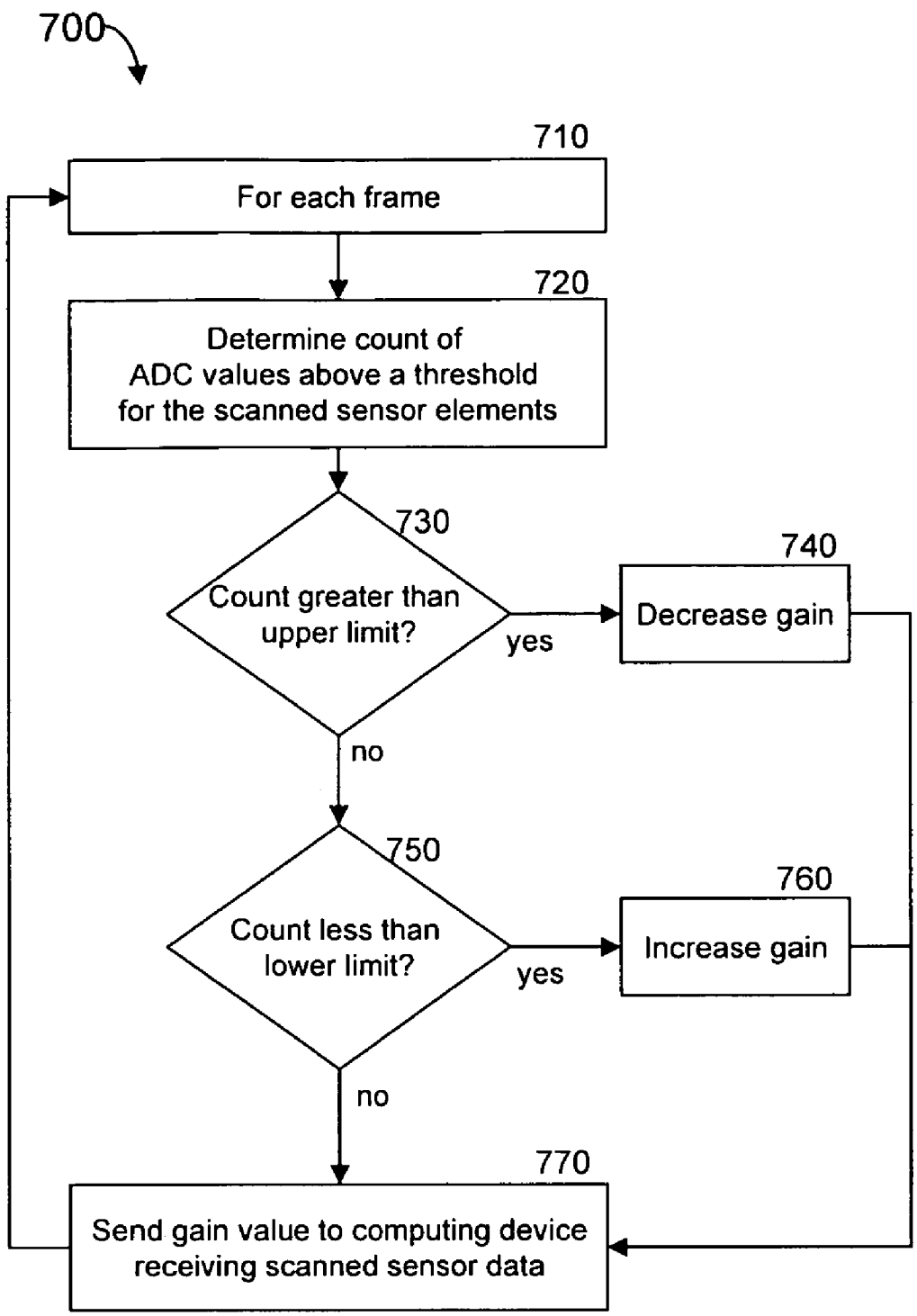
FIG. 7 is a flow diagram for automatic gain compensation according to one embodiment.

In various embodiments, a gain applied to the received signals from the sensor elements of a sensor array may be compensated automatically. In some embodiments, an adjustment of the gain may be performed for each frame of collected sensor data. FIG. 7 is an embodiment of an automatic gain compensation method, illustrated by flow diagram 700, that may be performed within a handle. In one embodiment, a control circuit within the handle can adjust the gain of the receive line A/D converter on every frame based on received values from the previous frame. For each frame (710), a count of the number of receive line A/D converter outputs that are above a threshold can be determined (step 720). An example of the threshold value may be 220 for an 8-bit A/D converter. The count may serve as an indication of the signal strength of the frame as a whole. It should be appreciated that other types of signal strength values may be used, including, but not limited to, an integrated or average signal value over all the scanned sensor elements. The count, or more generally, any signal strength value used to gauge the signal strength over the scanned frame, may be stored within a register in the control circuit.

At the end of a frame, a determination can be made as to whether the count is greater than an upper limit (step 730). For example, an upper limit value may be 10% of the total number of scanned sensor elements. If the count is greater than the upper limit, the gain of the receive line A/D converter may be decreased (step 740). The gain of the receive line A/D converter may be decreased by varying the reference voltage and/or the drive voltage. If the count is not greater than the upper limit, a determination may be made as to whether the count is less than a lower limit (step 750). If yes, the gain of the receive line A/D converter can be increased (step 760). If not, the process continues without a variation in the gain of the receive line A/D converter. The gain value of the receive line A/D converter may be sent to the computing device receiving the scanned sensor data (step 770) so that received scan data for each frame may be properly normalized based on the gain applied for the given frame. It should be appreciated that the threshold value, the upper count limit, and/or the lower count limit may be set by a user, may assume default values, and/or may be set via any other suitable means.

Figure 8:
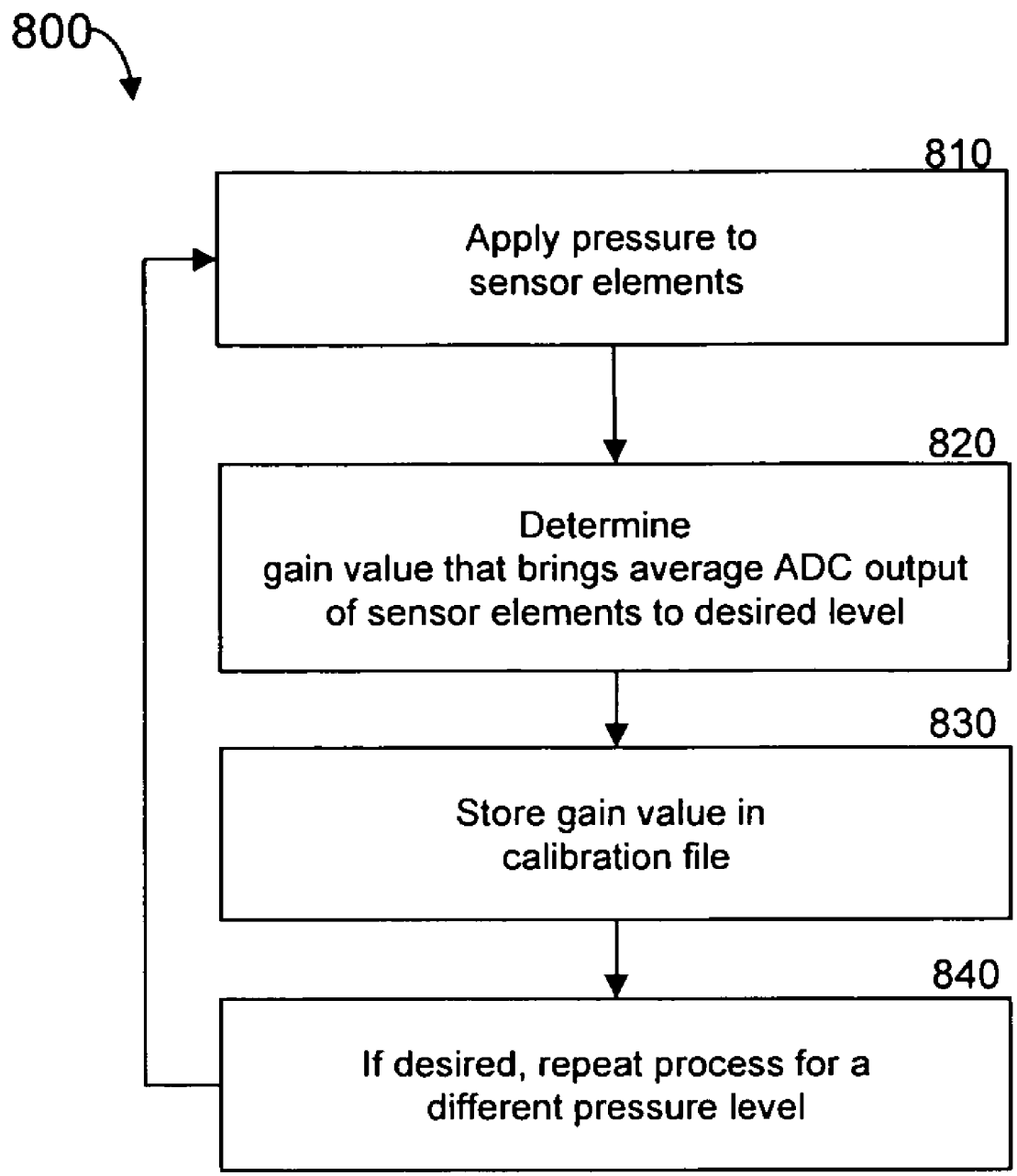
FIG. 8 is a flow diagram for performing a sensitivity calibration of a sensor array according to one embodiment.

In various embodiments, the sensitivity of a sensor array may be adjusted based on a typical pressure or force for which the sensor array is desired to operate in. In one embodiment, the sensitivity of the sensor array may be adjusted by setting a gain applied to signals received from the sensor elements. For a given pressure or force of operation, the gain value to be used to adjust the sensitivity of the sensor array may be determined using a sensitivity calibration procedure. FIG. 8 is an embodiment of a method, illustrated by flow diagram 800, for performing a sensitivity calibration for a sensor array. The method can involve the application of pressure to all sensor elements in the sensor array (step 810), for example, via the placement of the sensor array in a bladder assembly. Examples of applied pressures may include about 10 psi, 50 psi, 100 psi, 1000 psi, and/or any other suitable pressure. In step 820, a determination may be made as to the receive line A/D converter gain for which the averaged receive line A/D converter output (averaged over the sensor elements of the sensor array) attains a desired level. For example, the desired level for the averaged receive line A/D output may correspond to the initiation of a saturation condition for the applied pressure. Such a determination may be made by using any suitable algorithm, including, but not limited to, an incremental search over possible receive line A/D converter gain values, so as to place the averaged receive line A/D output in saturation for gain values above the target gain value and in non-saturation for gain values below the target gain value. The receive line A/D converter gain that results in the average receive line A/D converter output attaining the desired level may be stored in a sensor array sensitivity calibration file corresponding to the specific sensor array (step 830). In addition, if desired, as determined in step 840, steps 810-830 of the process may be repeated for other pressures or forces applied to the sensor array, thereby generating gain values to be used to adjust the sensitivity of the sensor array for use with different applied pressures or forces.

Some potential advantages of using a sensor array sensitivity calibration may include the possibility that the same sensor array can be used to measure pressures or forces that are within a range of +/−20 times the nominal sensor array's pressure or force saturation value. The improvement in range can improve production yield. Also, any changes in a sensor array's sensitivity due to wear can be compensated for via a sensor array sensitivity recalibration, which can prolong the sensor array's useful life.

Figure 9:
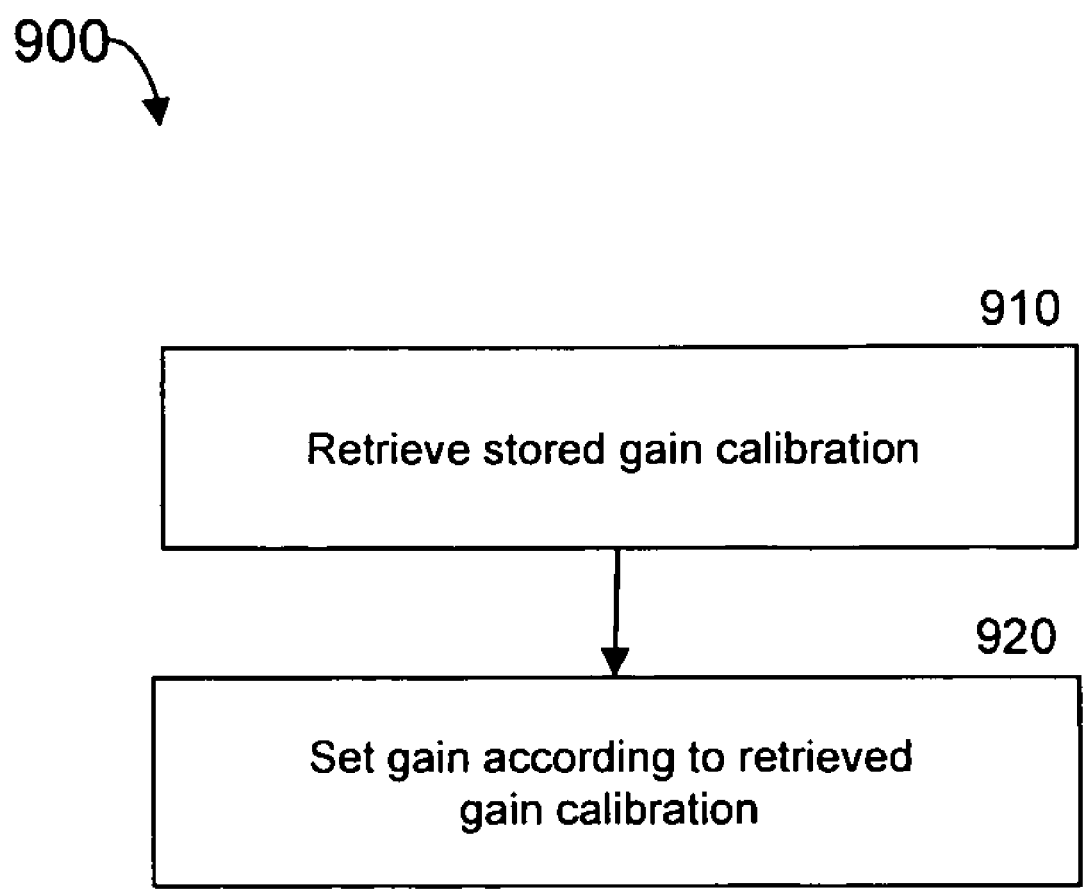
FIG. 9 is a flow diagram for adjusting the sensitivity of a sensor array based on a sensitivity calibration of the sensor array according to one embodiment.

FIG. 9 is an embodiment of a method, illustrated by flow diagram 900, for using a sensor array's sensitivity calibration data for a scanning operation at a desired typical pressure. The method may be performed in part or in whole by a control circuit (e.g., control circuit 34) that controls the scanning of the sensor array. In one embodiment, the sensor array's sensitivity calibration value may be generated using the method illustrated in FIG. 8. In step 910, a stored gain value may be retrieved from the previously generated sensor array sensitivity calibration data. In some embodiments, the retrieved gain value may depend on the typical pressure at which the sensor array is operated at. The typical pressure may be characteristic of the specific sensor array and the gain value that yields the desired sensitivity may be supplied by a manufacturer of the sensor array. The gain of the receive line A/D converter may be set according to the retrieved gain value (step 920), thereby adjusting the sensitivity of the sensor array consistent with the desired typical pressure of operation. It should be appreciated that the sensitivity adjustment of the sensor array may also be combined with one or more other gain adjustment processes, including, but not limited to the automatic gain adjustment process described in connection with FIG. 7.

Figure 10:
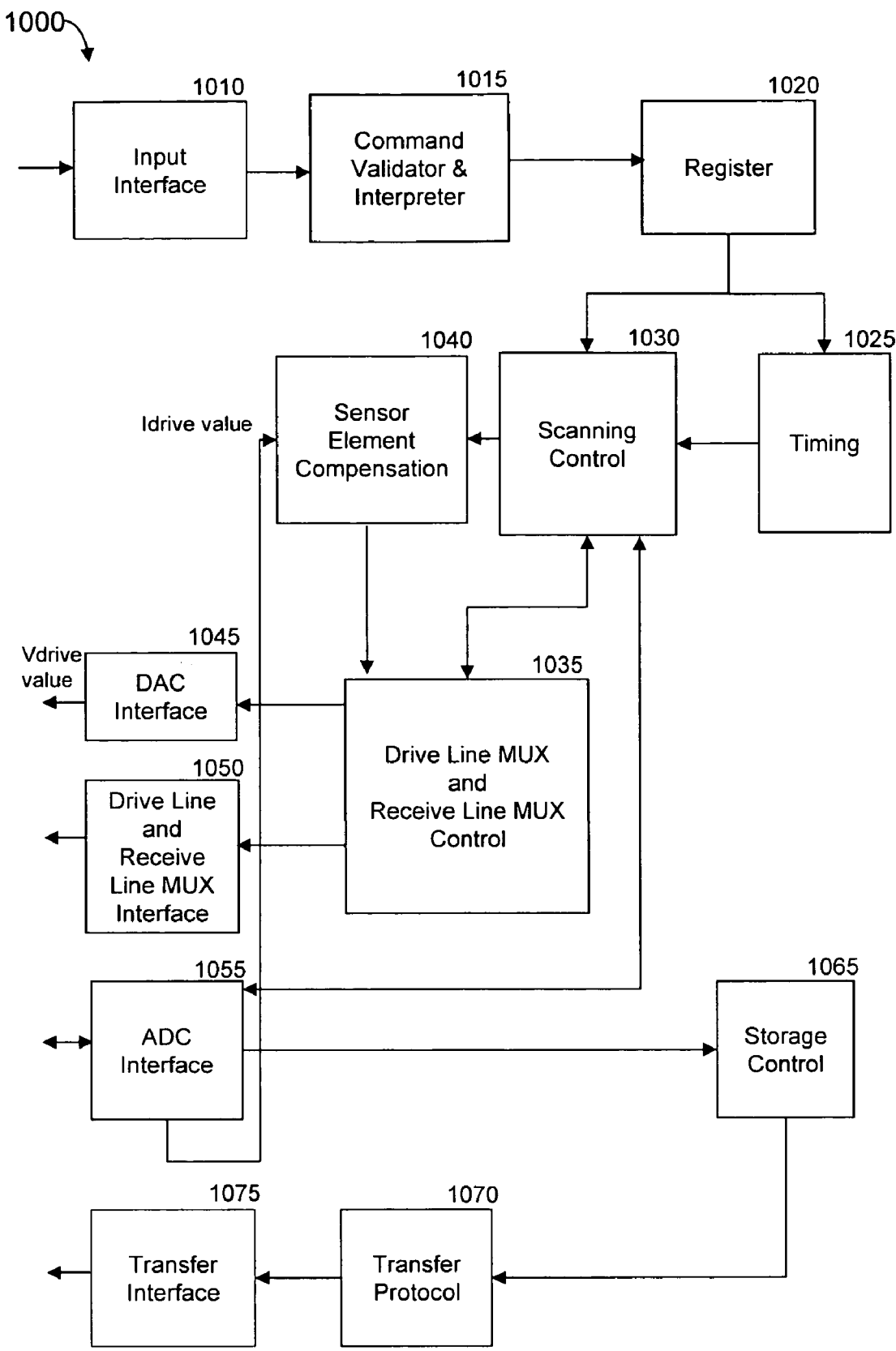
FIG. 10 is a functional block diagram of a control circuit for use with a sensor array according to one embodiment.

In some embodiments, one or more of the methods described herein may be implemented by a control circuit that controls the scanning of a sensor array. FIG. 10 is an illustrative embodiment of a functional block diagram 1000 of a control circuit that may be used in a handle that couples to a sensor array. In one embodiment, the control circuit implementing part or all of functional block diagram 1000 may be a field-programmable gate array (FPGA). In other embodiments, the control circuit implementing part or all of functional block diagram 1000 can be a standard microprocessor or other processor programmed to perform the various functions. In some embodiments, control circuit implementing functional block diagram 1000 may be a special purpose piece of hardware for performing these functions, may be some type of hybrid circuit which performs some of the functions itself and serves as an interface with other processing circuitry which performs the other functions, or may be other suitable control circuitry.

The control circuit can include an input interface 1010 with a communication link (not shown) that can allow for input of instructions from a computing device. Input interface 1010 can send instructions to a command validator and interpreter 1015 that can validate and interpret the incoming instructions. The interpreted instructions, which can include calibration data for sensor elements, automatic gain adjustment parameters, calibration data for sensor array sensitivity adjustment, and/or scan options, can be sent to and stored in a register 1020. The calibration data can include one or more of the previously described calibration data stored in calibration files on the computing device. The scan options may include user definable scan subset or subsets that may be represented in a scan table, and other options, such as a frame sample rate for scan recording. Register 1020 can transfer relevant instructions and/or calibration data to one or more other modules. For example, the frame sample rate may be transferred to a timing module 1025, which can generate various pulses having different periods which can synchronize the operation of one or more modules of the control circuit. In the functional illustration of FIG. 10, the timing module 1025 can send timing pulses to a scanning control module 1030.

Scanning control module 1030 can receive scan instructions from the register 1020. When a scan table is provided as a means for controlling the scanning of a subset or subsets of sensor elements of the sensor array, the scanning control module 1030 can access and/or receive the scan table from the register 1020. In other embodiments, the scanning control module need not necessarily receive a scan table, and may scan all of the sensor elements on the sensor array, for example, by incrementing row and column values corresponding to the sensor elements of the sensor array. For each frame of data collection, scan control module 1030 can step through the sensor elements to be scanned, and can generate signals that may be sent to one or more modules and that can indicate the drive and receive line of a selected sensor element. In particular, the scanning control module can communicate with a sensor element compensation module 1040, a drive and receive line multiplexer control module 1035 and an A/D interface module 1055.

The ADC interface enables the reading of the output from one or more A/D converters (e.g., A/D converter 24 and 38 in FIG. 2). In particular, the ADC interface allows for the reading of receive line signals (e.g., output of A/D converter 38) and a drive current signal (e.g., output of A/D converter 24). The drive current signal read by the ADC interface 1055 can be sent to the sensor element compensation module 1040 which can determine drive voltage compensation based on the sensor element calibration data (which can be retrieved from the register 1020), as previously described in method 600. Compensated drive voltage values may be sent to the drive and receive line multiplexer control module 1035.

The drive and receive line multiplexer control module 1035 can control the selection of the drive line and receive line which may be selected via communication with drive and receive line multiplexer interface 1050. Also, module 1035 may control a DAC interface 1045 which can set the drive voltage via interface with one or more D/A converters (e.g., D/A converter 32 and 36).

The ADC interface 1055 may send the receive line A/D converter output values to storage control module 1065 which can store received signals for sensor elements in a frame. Once the sensor elements to be scanned for each frame have been received by storage control module 1065, a complete frame of data and any other corresponding data (e.g., automatic gain values used) may be sent to transfer protocol module 1070, which can encode the data using a suitable protocol. The encoded data may be sent to transfer interface 1075 which can transfer the data to the communication link (not shown). It should be appreciated that the simplified block diagram only shows some of the interactions between modules, as will be readily understood by those of ordinary skill in the art. In some embodiments, at least some of the modules of the control circuit may be configured to operate in parallel. In one embodiment, the scanning control module may be configured to operate in parallel with the ADC interface. Such parallel operation can be used to enhance data processing, including data acquisition and/or transfer rates.

Figure 11:
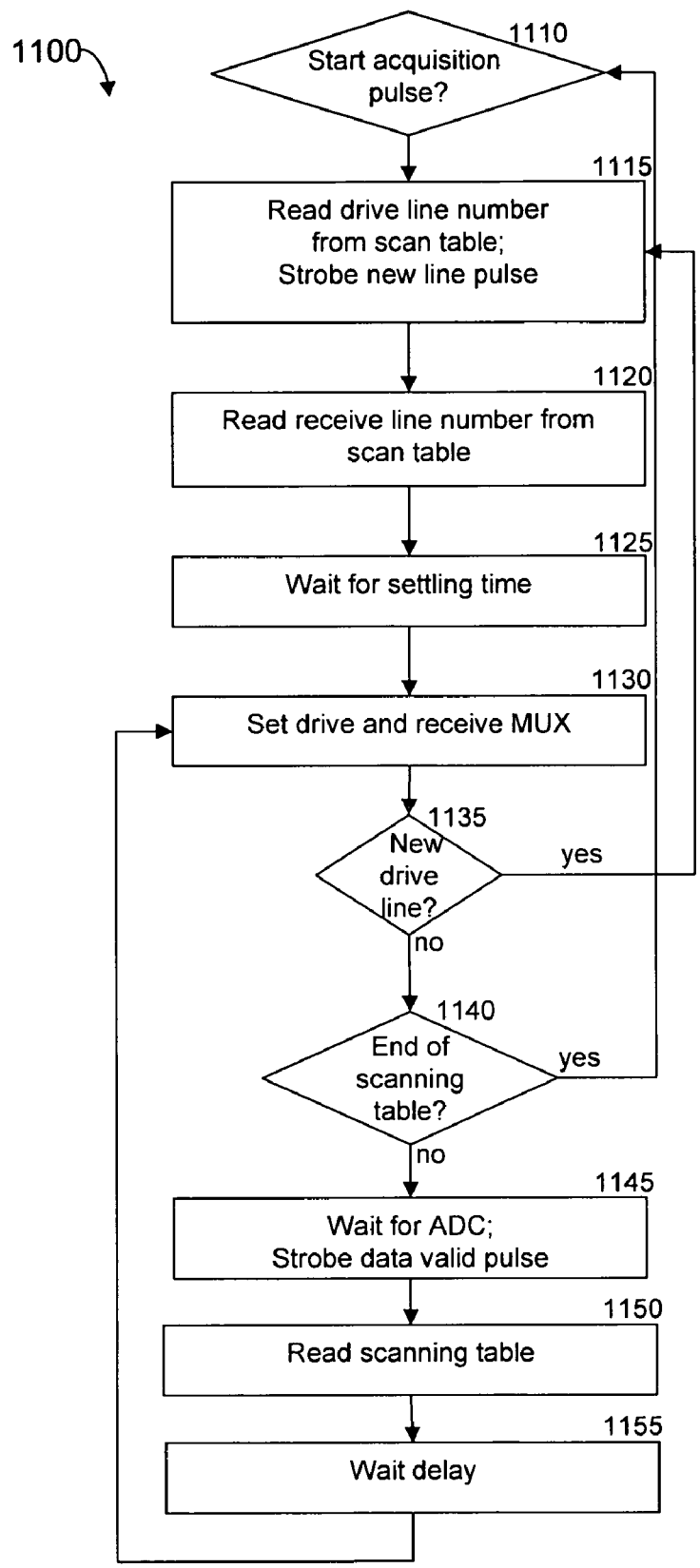
FIG. 11 is a flow diagram for scan control using a scan table according to one embodiment.

FIG. 11 illustrates an embodiment of method 1100 that can be implemented by a scanning control module (e.g., scanning control module 1030) within a control circuit. The method 1100 can be used to implement scanning of a subset or subsets of sensor elements of a sensor array using a scan table, for example, the scan table 1200 illustrated in FIG. 12. The method includes a determination of whether a start acquisition pulse is triggering (step 1110). The start acquisition pulse may have been triggered upon the initiation of a new frame in a recording of multiple frames, or via a request for a snapshot of a single frame. The drive line number may be read from the scan table (step 1115). For example, value 1211 may be read from the scan table 1200, and the drive line number may be extracted from the value. A pulse that indicates that the drive line is being changed is generated and may be sent to one or more modules within the control circuit (step 1115). The next value in the scan table may be read (e.g., value 1212), and the receive line number may be extracted from the value (step 1120). The method 1100 may include waiting for a settling time (e.g., about 15 μs) (step 1125), which may be specified in the register.

In step 1130, the drive and receive line multiplexer values may be set via interface with the drive line and receive line multiplexer control module (e.g., module 1035). In parallel, other modules in the control circuit may acquire, compensate, and process the acquired sensor element data. In the meanwhile, method 1100 can proceed to determine if a new drive line value in the scan table has been read (step 1135) and if the end of the scanning table had been encountered (step 1140). In the first pass though the method for the first receive line value (e.g., value 1212) neither condition will be true and the method may include waiting a specified time for the measurement of the receive line to be completed (step 1145). Once the waiting time elapse, a pulse that indicates that a valid data measurement had been made may be generated and may be sent to one or more modules in the control circuit (step 1145). The next value in the scan table may be read (e.g., value 1213) (step 1150). After another wait delay (step 1155), the method loops back and continues with step 1130 where the drive and receive multiplexers are set. A determination may be made as to whether a new drive line has been encountered (step 1135), and if so, the method continues with step 1115. Similarly, in step 1140, a determination is made as to whether the end of the scanning table had been encountered, and if so, the method returns to a state of waiting for a start acquisition pulse.

It should be appreciated that various combinations of the above-described embodiments can be employed together, but several aspects of the invention are not limited in this respect. Therefore, although the specific embodiments disclosed in the figures and described in detail employ particular combinations of features, it should be appreciated that the present invention is not limited in this respect, as the various aspects of the present invention can be employed separately, or in different combinations. Thus, the particular embodiments described in detail are provided for illustrative purposes only.

It should also be appreciated that a variety of features employed in the art of processors may be used in combination with or to modify the above-described features and embodiments.

The foregoing written specification is to be considered to be sufficient to enable one skilled in the art to practice the invention. While the best mode for carrying out the invention has been described in detail, those skilled in the art to which this invention relates will recognize various alternative embodiments including those mentioned above as defined by the following claims. The examples disclosed herein are not to be construed as limiting of the invention as they are intended merely as illustrative of particular embodiments of the invention as enabled herein. Therefore, systems and methods that are functionally equivalent to those described herein are within the spirit and scope of the claims appended hereto. Indeed, various modifications of the invention in addition to those shown and described herein will become apparent to those skilled in the art from the foregoing description and fall within the scope of the appended claims.

What is claimed is:

1. A method of automatically adjusting gain when scanning an array of pressure or force responsive sensor elements, the method comprising:
   (A) detecting a frame of received signals corresponding to a plurality of sensor elements of the array being scanned;
   (B) determining a signal strength value at least partially based on the frame of received signals, the signal strength value comprising a count of a number of the received signals of the frame that are greater than a threshold signal value; and
   (C) adjusting a gain applied to at least some signals received from the array based at least partially on the signal strength value.

2. The method of claim 1, wherein (C) comprises decreasing the gain applied to at least some signals received from the array as a result of the signal strength value being greater than an upper limit.

3. The method of claim 1, wherein (C) comprises increasing the gain applied to at least some signals received from the array as a result of the signal strength value being less than a lower limit.

4. The method of claim 1, wherein the frame of received signals is a first frame of received signals, and wherein (C) comprises adjusting a gain applied to at least some signals of a second frame of received signals.

5. A method of automatically adjusting gain when scanning an array of pressure or force responsive sensor elements, the method comprising:
   (A) detecting a frame of received signals corresponding to a plurality of sensor elements of the array being scanned;
   (B) determining a signal strength value at least partially based on the frame of received signals, wherein the signal strength value comprises an average received signal of the frame of received signals; and
   (C) adjusting a gain applied to at least some signals received from the array based at least partially on the signal strength value.

6. The method of claim 5, wherein the frame of received signals is a first frame of received signals, and wherein (C) comprises adjusting a gain applied to at least some signals of a second frame of received signals.

7. The method of claim 5, wherein (C) comprises decreasing the gain applied to at least some signals received from the array as a result of the signal strength value being greater than an upper limit.

8. The method of claim 5, wherein (C) comprises increasing the gain applied to at least some signals received from the array as a result of the signal strength value being less than a lower limit.

9. A method of calibrating a sensitivity of a sensor array of pressure or force responsive sensor elements, each of the sensor elements being connected by one of one or more first electrodes and one of one or more second electrodes, the sensor elements having signals generated therethrough, the signals being characteristic of a pressure or force applied to the sensor array, the one or more second electrodes having received signals thereon associated with the sensor elements, the received signals being modified by a gain value, the method comprising:
   (A) obtaining received signals associated with at least some of the sensor elements; and
   (B) determining the gain value that modifies the received signals associated with the at least some of the sensor elements so that at least some of the received signals associated with the at least some of the sensor elements lie within a desired range, wherein (B) comprises:
- determining an average received signal of the received signals associated with the at least some of the sensor elements; and
- determining the gain value that modifies the received signals associated with the at least some of the sensor elements so that the average received signal lies within the desired range, wherein the desired range comprises a saturation point of the average received signal.

10. The method of claim 9, wherein the determined gain value is stored as calibration data associated with the sensor array.

11. The method of claim 9, wherein the saturation point of the average received signal is an upper limit of the desired range.

12. The method of claim 9, wherein determining the gain value that modifies the received signals associated with the at least some of the sensor elements so that the average received signal lies within a desired range comprises determining the gain value that modifies the received signals associated with the at least some of the sensor elements so that the average received signal is approximately equal to the saturation point of the average received signal.

13. The method of claim 9, wherein determining the gain value that modifies the received signals associated with the at least some of the sensor elements so that the average received signal lies within a desired range comprises determining the gain value that modifies the received signals associated with the at least some of the sensor elements so that the average received signal is less than the saturation point of the average received signal.

14. A method of calibrating a sensitivity of a sensor array of pressure or force responsive sensor elements, each of the sensor elements being connected by one of one or more first electrodes and one of one or more second electrodes, the sensor elements having signals generated therethrough, the signals being characteristic of a pressure or force applied to the sensor array, the one or more second electrodes having received signals thereon associated with the sensor elements, the received signals being modified by a gain value, the method comprising:
- (A) obtaining received signals associated with at least some of the sensor elements; and
- (B) determining the gain value that modifies the received signals associated with the at least some of the sensor elements so that at least some of the received signals associated with the at least some of the sensor elements lie within a desired range, wherein the desired range comprises a saturation point of the at least some of the received signals.

15. The method of claim 14, wherein the determined gain value is stored as calibration data associated with the sensor array.

16. The method of claim 14, wherein the saturation point of the at least some of the received signals is an upper limit of the desired range.

17. The method of claim 14, wherein determining the gain value that modifies the received signals associated with the at least some of the sensor elements so that at least some of the received signals associated with the at least some of the sensor elements lie within a desired range comprises determining the gain value that modifies the received signals associated with the at least some of the sensor elements so that at least some of the received signals associated with the at least some of the sensor elements are less than the saturation point of the at least some of the received signals.

* * * * *

UNITED STATES PATENT AND TRADEMARK OFFICE
CERTIFICATE OF CORRECTION

PATENT NO. : 7,591,165 B2　　　　　　　　　　　　　　　　　　　　　　　　　Page 1 of 1
APPLICATION NO. : 11/392210
DATED : September 22, 2009
INVENTOR(S) : Thomas Papakostas et al.

It is certified that error appears in the above-identified patent and that said Letters Patent is hereby corrected as shown below:

At Column 10, line 44, "AID" should read --A/D--.

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO.       : 7,591,165 B2
APPLICATION NO.  : 11/392210
DATED            : September 22, 2009
INVENTOR(S)      : Papakostas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 198 days.

Signed and Sealed this

Twenty-first Day of September, 2010

David J. Kappos
*Director of the United States Patent and Trademark Office*